US010733665B2

United States Patent
Monkman et al.

(10) Patent No.: US 10,733,665 B2
(45) Date of Patent: Aug. 4, 2020

(54) MULTIPLE INTERACTION AUCTION

(71) Applicant: Google LLC, Mountain View, CA (US)

(72) Inventors: Christopher Davis Monkman, Sunnyvale, CA (US); Aranyak Mehta, Palo Alto, CA (US); Omkar Muralidharan, Sunnyvale, CA (US); Christopher M. Roat, Los Altos, CA (US); Bartholomew Furrow, Mountain View, CA (US); Edward A. Baltz, Mountain View, CA (US)

(73) Assignee: Google LLC, Mountain View, CA (US)

( * ) Notice: Subject to any disclaimer, the term of this patent is extended or adjusted under 35 U.S.C. 154(b) by 26 days.

(21) Appl. No.: 16/242,114

(22) Filed: Jan. 8, 2019

(65) Prior Publication Data

US 2019/0205974 A1    Jul. 4, 2019

Related U.S. Application Data

(63) Continuation of application No. 14/337,986, filed on Jul. 22, 2014, now Pat. No. 10,198,765.

(51) Int. Cl.
*G06Q 30/02* (2012.01)
*G06Q 30/08* (2012.01)

(52) U.S. Cl.
CPC ......... *G06Q 30/08* (2013.01); *G06Q 30/0275* (2013.01); *G06Q 30/0251* (2013.01)

(58) Field of Classification Search
CPC .................................................... G06Q 30/02
See application file for complete search history.

(56) References Cited

U.S. PATENT DOCUMENTS

| 10,198,765 B2 | 2/2019 | Monkman et al. |
| 2007/0067215 A1 | 3/2007 | Agarwal et al. |
| 2007/0192314 A1 | 8/2007 | Heggem |
| 2007/0260596 A1 | 11/2007 | Koran |
| 2008/0133320 A1 | 6/2008 | Gluhovsky |
| 2008/0183675 A1 | 7/2008 | Schwarz |
| 2009/0016507 A1 | 1/2009 | Altberg et al. |
| 2009/0070219 A1 | 3/2009 | D'Angelo |

*Primary Examiner* — Vincent M Cao
(74) *Attorney, Agent, or Firm* — Fish & Richardson P.C.

(57) ABSTRACT

Methods, systems, and apparatus, including computer programs encoded on a computer storage medium, for distributing content items. In one aspect, a method includes identifying a content item that is eligible to be provided in response to a content item request and is associated with a bid. It is determined that the identified content item includes two or more different interactive elements that each cause different actions to be initiated in response to user interaction with the different interactive elements. An auction score is determined for the content item based on a function of the bid, a bid modifier for each different interaction, and a probability that each interaction will be invoked. The content item is selected to be provided based on the auction score. Data that cause presentation of the selected content item at a user device are output.

20 Claims, 5 Drawing Sheets

MULTIPLE INTERACTION AUCTION

CROSS-REFERENCE TO RELATED APPLICATION

This application is a continuation of U.S. application Ser. No. 14/337,986, filed Jul. 22, 2014, the contents of which are incorporated by reference herein.

BACKGROUND

This specification relates to data processing and content distribution.

The Internet facilitates the exchange of information and transactions between users across the globe. This exchange of information enables content sponsors to provide sponsored content to a variety of users. A content sponsor can control the distribution of their content items (e.g., promotions, advertisements, audio files, video files, or other content items) based on a set of distribution parameters that specify under what conditions a content item is eligible to be distributed. When a presentation opportunity meeting the conditions is available, the content item provided by a content sponsor is deemed eligible to be provided for presentation.

SUMMARY

In general, one innovative aspect of the subject matter described in this specification can be embodied in methods that include the actions of receiving a content item request; identifying, based on information included in the content item request, a content item that is eligible to be provided in response to the content item request and is associated with a bid specifying an amount that a content sponsor has specified for distribution of the content item; determining that the identified content item includes two or more different interactive elements that each cause different actions to be initiated in response to user interaction with the different interactive elements; identifying, for each different action, a probability that the action will be invoked through user interaction with an interactive element of the content item and a bid modifier for the interaction; determining an auction score for the content item based on a function of the bid, the bid modifier for each different interaction, and the probability that each interaction will be invoked; selecting, based on the auction score, the content item to be provided in response to the content item request; and outputting data that cause presentation of the selected content item at a user device. Other embodiments of this aspect include corresponding systems, apparatus, and computer programs, configured to perform the actions of the methods, encoded on computer storage devices.

These and other embodiments can each optionally include one or more of the following features. Methods can include the action of determining a baseline cost for the content item based on a next highest auction score relative to the auction score for the content item, the probability that each interaction will be invoked, and the bid modifier for each interaction.

Methods can include the actions of determining that one of the different actions was invoked after the content item was provided for presentation at the user device; and determining a price of providing the content item based on the baseline cost and the bid modifier of the invoked action.

Determining the price can include determining a product of the baseline cost and the bid modifier. Determining a baseline cost can include determining a ratio of a sum of the next highest auction score and an overall negative effect of providing the content item relative to a weighted sum of the probabilities that each of the actions will be invoked.

Determining the ratio can include determining a first product of a first probability that a user will invoke a first action and the bid modifier for the first action; determining a second product of a second probability that a user will invoke a second action and the bid modifier for the second action; summing the first product and the second product to obtain the weighted sum of the probabilities; summing the next highest auction score and the overall negative effect of providing the content item to obtain a modified next highest auction score; and determining the baseline cost based on a ratio of the modified next highest auction score and the weighted sum of the probabilities.

Determining an auction score for the content item can include determining a difference between an estimated benefit corresponding to distribution of the content item and an overall negative effect of providing the content item.

Particular embodiments of the subject matter described in this specification can be implemented so as to realize none, one, or more of the following advantages. Allocation techniques described throughout this document provide a single auction score that can be used to distribute content items that each have multiple different, and potentially disparate, actions that can be separately invoked through different user interactions with the content item. These techniques also enable a content distribution apparatus to determine different prices that will be paid by a content sponsor based, in part, on a single bid that is provided by the content sponsor. The prices paid by the content sponsor for the different actions can each reflect the benefit of the action to the content sponsor, thereby facilitating more efficient distribution of content items by a content sponsor. The techniques described enable direct comparison of content items in an auction environment despite the fact that different content items may provide different actions that a user can invoke.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
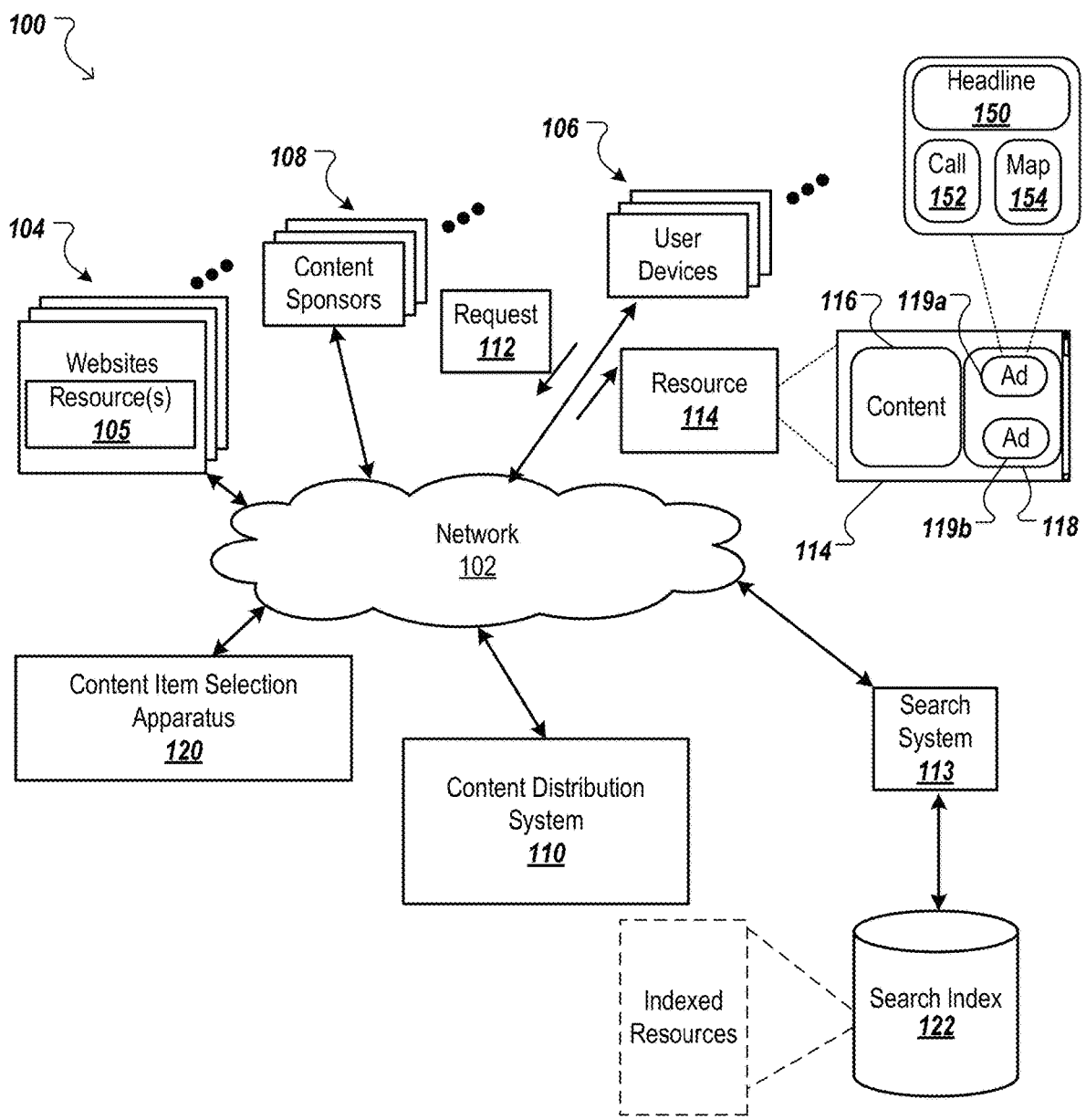
FIG. 1 is a block diagram of an example environment in which content is distributed to user devices.

This document describes apparatus, systems, methods, and computer readable medium related to selecting content items for distribution. In some implementations, a selection process can select, for presentation in response to a content item request, a set of content items (e.g., advertisements) that facilitate performance of various different actions by a user to whom the content items are presented. For example, the content items can have various combinations of interaction elements that enable users to invoke actions such as a click to call action, a map request action, a request for a landing page, or other actions.

As discussed in more detail throughout this document, a content sponsor that provides a content item that enables a user to invoke multiple different actions may value each of those different actions differently. Additionally, each different content sponsor may value various different actions differently. The different values attributed to each of the different actions by the various different content sponsors, as well as the variety of different actions that can be associated with the different content items can make it difficult to directly compare content items for purposes of selecting content items that will be provided in response to a particular content item requests.

The techniques discussed throughout this document facilitate direct comparison of content items despite the fact that each of the content items may provide a different set of actions, and despite the fact that the various content sponsors may attach a different value to the same action. In some implementations, the selection of the content items is facilitated using an auction score that takes into account, at least in part, the relative value of each action to a particular content sponsor and the probability that each of the actions will be invoked by a user if the content item is presented in response to the content item request. The auction scores that are obtained for each of the content items can be used to select a set of content items that will be provided in response to the request (e.g., the content items having the highest auction scores).

When it is determined that one of the actions was invoked by a user, the content sponsor of the content item from which the action was invoked can be charged a price for distribution of the content item. The price that the content sponsor is charged can be based on a minimum bid required for the content sponsor to maintain their ranking among the content items (e.g., based on the auction scores) and the bid modifier that the content sponsor provided for the action that was invoked, as described in detail with reference to FIG. 4. As described in more detail below, a content sponsor can specify a different bid for each different action instead of specifying a single minimum bid and a bid modifier for each action.

The following description refers to selection and distribution of advertisements, which are a type of content item. The description that follows is also applicable to other types of content items. For example, any video file, audio file, or other content item can be distributed using the techniques described below.

FIG. 1 is a block diagram of an example environment 100 in which content is distributed to user devices 106. The example environment 100 includes a network 102, such as a local area network (LAN), a wide area network (WAN), the Internet, or a combination thereof. The network 102 connects websites 104, user devices 106, content sponsors 108, and a content distribution system 110. The example environment 100 may include many different websites 104, user devices 106, and content sponsors 108.

A website 104 is one or more resources 105 associated with a domain name and hosted by one or more servers. An example website is a collection of web pages formatted in hypertext markup language (HTML) that can contain text, images, multimedia content, and programming elements, such as scripts. Each website 104 is maintained by a publisher, which is an entity that controls, manages and/or owns the website 104.

A resource 105 is any data that can be provided over the network 102. A resource 105 is identified by a resource address that is associated with the resource 105. Resources include HTML pages, word processing documents, and portable document format (PDF) documents, images, video, and feed sources, to name only a few. The resources can include content, such as words, phrases, images and sounds, that may include embedded information (such as meta-information in hyperlinks) and/or embedded instructions (such as scripts). Units of content that are presented in (or with) resources are referred to as content items, and an individual content item can be stored in a single file or set of files independent of the resource.

A user device 106 is an electronic device that is capable of requesting and receiving resources over the network 102. Example user devices 106 include personal computers, mobile communication devices, and other devices that can send and receive data over the network 102. A user device 106 typically includes a user application, such as a web browser, to facilitate the sending and receiving of data over the network 102.

A user device 106 can submit a resource request 112 that requests a resource 105 from a website 104. In turn, data representing the requested resource 114 can be provided to the user device 106 for presentation by the user device 106. The requested resource 114 can be, for example, a home page of a website 104, a web page from a social network, or another resource 105. The data representing the requested resource 114 can include data that cause presentation of resource content 116 at the user device 106. The data representing the requested resource 114 can also include data specifying a content item slot 118.

A content item slot is a portion of the resource (e.g., a portion of a web page) or a portion of a user display (e.g., a presentation location of another window or in a slot of a web page) in which one or more content items, such as advertisements, can be presented. A content items slot 118 can also be referred to as an advertisement slot, but any type of content (e.g., content items other than advertisements) can be presented in the content item slot 118.

A single content item slot 118 may be configured to include one or more presentation positions 119a and 119b. Alternatively or additionally, each different content item slot 118 can be considered a separate presentation position, and a resource can include multiple different content item slots. Each presentation position can represent a portion of the content item slot 118 at which a content item can be presented. In some implementations, the number of presentation positions and/or the size of the presentation positions for a particular content item slot 118 may be determined based on the number, type, and/or value of content items that are available for presentation in the content item slot.

To facilitate searching of resources, the environment 100 can include a search system 113 that identifies the resources by crawling and indexing the resources provided by the publishers on the websites 104. Data about the resources can be indexed based on the resource with which the data are associated. The indexed and, optionally, cached copies of the resources are stored in a search index 122. Data that are associated with a resource is data that represents content included in the resource and/or metadata for the resource.

User devices 106 can submit search queries to the search system 113 over the network 102. In response, the search system 113 accesses the search index 122 to identify resources that are relevant to the search query. The search system 113 identifies the resources in the form of search results and returns the search results to the user device in search results page. A search result is data generated by the search system 113 that identifies a resource that is responsive to a particular search query, and includes a link to the resource. An example search result can include a web page title, a snippet of text or a portion of an image extracted from the web page, and the URL of the web page. Like other resources, search results pages can include one or more content item slots 118 in which content items, such as advertisements, can be presented.

When a resource 105 is requested by a user device 106, execution of code associated with a content item slot 118 in the resource initiates a request for one or more content items to populate the slot, which is referred to as a content item request. The content item request can include characteristics of the slots that are defined for the requested resource 114. For example, a reference (e.g., URL) to the requested resource 114 for which the content item slot 118 is defined, a size of the content item slot, a maximum number of presentation positions (or content items) that can be included in the content item slot 118, and/or media types that are eligible for presentation in the content item slot 118 can be provided to the content distribution system 110. Similarly, keywords associated with a requested resource ("resource keywords") or entities that are referenced by the resource can also be provided to the content distribution system 110 to facilitate identification of content items that are relevant to the requested resource 114. Content item requests can also include other information, such as information that the user has provided, geographic information indicating a state or region from which the request was submitted, or other information that provides context for the environment in which the content item will be displayed (e.g., a type of device at which the content item will be displayed, such as a mobile device or tablet device).

The content items that are provided in response to a content item request (or another request) are identified based, in part, on distribution parameters associated with the content items. Distribution parameters are a set of criteria upon which distribution of content items are conditioned. In some implementations, the distribution parameters for a particular content item can include distribution keywords that must be matched (e.g., by resource keywords or search queries) in order for the content item to be eligible for presentation. The distribution parameters can also require that the content item request include information specifying a particular geographic region (e.g., country or state) and/or information specifying that the content item request originated at a particular type of user device. The distribution parameters can also specify a bid and/or budget for distributing the particular content item. As described in more detail below, bids can be used to select a set of content items for presentation with a resource and/or to determine in which presentation position the content item(s) will be presented.

The content items are selected for presentation in the presentation position based on the outcome of a content item selection process. In some implementations, the content item selection process can include an auction. The auction can be performed based, at least in part, based on bids that are associated with the content items. For example, assume that a first content item is associated with a cost per click (CPC) bid of $1.25 and a second content item is associated with a CPC bid of $1.00. In this example, the first content item may be selected for presentation in the presentation position 119a (e.g., a highest presentation position) and the second content item can be selected for presentation in presentation position 119b because the bid for content item 1 is higher than the bid for content item 2.

In the example above, the content items were selected based solely on the values of their respective CPC bids. However, content items can be selected based on auction scores that are determined based on additional (or other) information. For example, an auction score for a particular content item can be a product of a CPC bid of the content item and a probability that a user will click on the content item to request a landing page to which the content item links (e.g., CPC bid*p_click, where p_click is the probability that a user will click the content item when presented). Note that for purposes of example, this document refers to bid generally, and that a bid can be specified as a CPC bid or a CPM ("cost-per-mille") bid, and CPC bids can be converted to an eCPM (estimated CPM) value so that the bids can be directly compared.

The eCPM bid can be determined, for example, based on a product of an interaction rate (e.g., click rate) for a content item and the CPC bid for the content item. If the content item offers two or more different actions that a user can invoke through interaction with the content item, the eCPM for that content item can be determined based on a sum of the products of the interaction rate for the action and the bid (e.g., $\Sigma_1^x \text{InteractionRate}_x * \text{bid}$, where $\text{InteractionRate}_x$ is the interaction rate for Action_x and bid is the bid specified for the content item).

The probability that a particular content item will receive a click (or another interaction) can be based on a historical click through rate (or interaction rate) of the content item. For example, assume that a particular content item has a historical click rate of 0.10, indicating that the particular content item receives one click for every ten presentations of the content item. In this example, the probability that the content item will receive a click can be set to 0.10. Thus, the value 0.10 can be multiplied by the CPC bid for the particular content item to obtain the auction score for the particular content item. In turn, the content items having the highest N auction scores can be selected for presentation in N available presentation positions, where N is an integer number of available presentation positions.

Some content items provide the ability for users to take actions beyond the user clicking on the advertisement to request an advertiser landing page. For example, as illustrated by the example advertisement 119a, a content item can provide actions such as a headline click action in which user interaction with a headline 150 (e.g., advertisement text or another portion of the advertisement that does not invoke another action), referred to as a headline click, causes a user device to request a landing page associated with the example advertisement 119a. The example advertisement 119a can also provide a "click to call" action in which user interaction with a click to call interactive element 152 causes a user device (e.g., a mobile device or a device that communicates using Internet Protocol) to call a phone number corresponding to the content item (e.g., an advertiser's call center or retail location). Similarly, the example advertisement 119a can provide a "get directions" or "map request" action in which user interaction with a map interactive element 154 causes the user device to request a resource that presents a map and/or directions to an address corresponding to the content item (e.g., in a map interface).

The different actions a content item can provide may provide different benefits (e.g., value) to a content sponsor and/or a different experience for users depending on which action is invoked by the user. For example, as discussed in more detail throughout this document, a headline click by a user may provide one value to the advertiser and provide a specific experience for users, while a call to click action may provide a different value to the advertiser and provide a different experience for the user (e.g., talking to a sales representative or a customer service agent), and a get directions action may provide some other value to the content sponsor and/or provide another different experience for the user (e.g., determining how to get to a retail location of the content sponsor). Thus, content sponsors may be willing to pay a different amount for each of the different actions that are performed.

When content items are selected for presentation, it is not known whether a particular presentation of the content item will result in a user invoking zero, one, or more of the actions that can be invoked through user interaction with the different interaction elements that are provided in a single content item. Additionally, if different content items provide different actions, it can be difficult to directly compare these content items when selecting which content items will be provided in response to a content item request.

The environment 100 includes a content item selection apparatus (CISA) 120 that facilitates selection of content items to be provided in response to a content item request. In some implementations, the CISA 120 determines, for each of multiple different content items, an auction score (or selection score) that facilitates selection of content items irrespective of whether the content items provide the same actions, and without knowing which actions, if any, will actually be invoked by a user that is presented one or more of the content items.

As described in more detail below, the CISA 120 can determine the auction score for each content item based on a mathematical combination (e.g., function) of the bid for the content item, probabilities that each of the different actions will be invoked if the content item is presented to a user, and an estimated value to a user that invokes each of the different actions. As discussed in more detail below, the estimated value to a user that invokes a particular action can be based, at least in part, the positive effect (e.g., positive value to the user and/or the CISA 120) of a good user experience when the particular action is invoked and the negative effect (e.g., a negative value to the user and/or the CISA 120) of a bad user experience when the particular action is invoked. The combination of the estimated values of the various actions can be combined to provide an auction score that can be compared with auction scores of other advertisement (irrespective of how many and/or which actions are provided by the various content items) to select content items that will be provided in response to a content item request.

Figure 2:
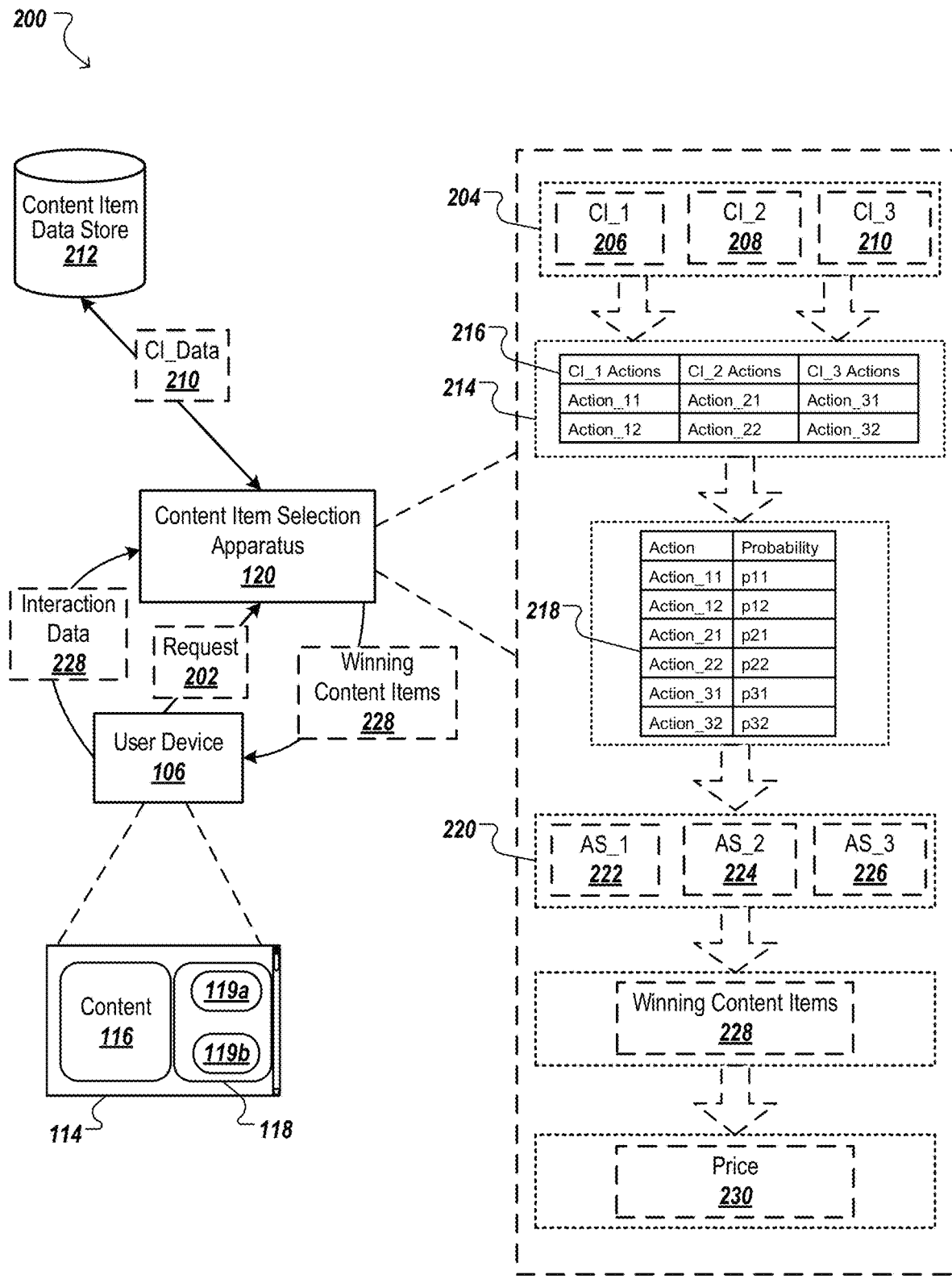
FIG. 2 is a block diagram of an example data flow for selecting content items for distribution.

FIG. 2 is a block diagram of an example data flow 200 for selecting content items for distribution. The data flow 200 begins with the CISA 120 receiving a content item request 202. The content item request 202 is a request for one or more content items (e.g., advertisements) that will be presented with a resource (e.g., web page or video). For example, as illustrated by FIG. 2, the content item request 202 ("request") can be submitted by a user device 106 when the resource 114 is rendered at the user device 106. For example, execution of code included in the resource 114 can cause the user device 106 to submit the content item request 202. Alternatively, the request 202 could be initiated when playback of a video reaches a portion of the video at which advertisements will be inserted.

The CISA 120 can receive the content item request 202 directly from the user device 106 or from another device or system (e.g., the content distribution system 110). For example, if the CISA 120 is implemented independent of the content distribution system 110, the user device 106 may submit the content item request 202 to the content distribution system 110, which can provide the content item request 202 (or data associated with the content item request 202) to the CISA 120.

The content item request 202 can include data specifying a number of content items that can be presented with the resource 114. For example, as illustrated by FIG. 2, the resource 114 includes a content item slot 118 having two presentation positions 119a and 119b. In this example, the content item request 202 may specify that up to two content items can be presented with the resource 114 (e.g., in presentation positions 119a and 119b).

In response to receiving the request 202, the CISA 120 can identify a set of eligible content items 204 that are eligible to be provided in response to the request. The set of eligible content items can be identified, as described for example with reference to FIG. 1, based on distribution parameters associated with the content items and/or information included in the request 202. In some implementations, the set of eligible content items will include a set of a first content item ("CI_1") 206, a second content item "(CI_2") 208, and a third content item ("CI_3") 210.

In some implementations, the set of eligible content items 204 are identified by content item data 210 that is accessed from a content item data store 212. The content item data 210 can specify, for example, a name that identifies the content item, data specifying the type of content item (e.g., text advertisement, image advertisement, or video advertisement), a bid specifying an amount that a content sponsor will pay for distribution of the content item, and other information related to the content item (e.g., dimensions, distribution parameters for the content item, or other information).

The content item data 210 can include an independent bid (e.g., separate and/or different bid) for each of the content items in the set of content items 204. For example, the content item data 210 can specify that the content item CI_1 has a bid of B1, the content item CI_2 has a bid of B2, and the content item CI_3 has a bid of B3. The respective values of B1, B2, and B3 can be specified by the content sponsors of the respective content items CI_1, CI_2, and CI_3.

The CISA 120 determines based, at least in part, on the content item data 210 a set of actions 214 that are made available by the set of content items 204. For example, as illustrated by the table 216, the CISA 120 can determine that content item CI_1 provides the ability for a user to invoke Action_11 and Action_12 through interaction with interaction elements of the content item CI_1, content item CI_2 provides the ability for a user to invoke Action_21 and Action_22 through interaction with content item elements of the content item CI_2, and content item CI_3 provides the ability for a user to invoke Action_31 and Action_32 through interaction with interaction elements of the content item CI_3.

As described above with reference to FIG. 1, the actions that can be invoked through user interaction with interaction elements of a content item can include placing a call to a phone number referenced by the content item, requesting a map showing a location and/or directions to a retail location (or another location) referenced by the content item, requesting a landing page referenced by the content item, or other actions (e.g., sending an e-mail to (or otherwise sharing information with) a specified set of users, posting information about the content item on a social network page (or stream) of the user, printing a coupon or placing an order with the content sponsor).

The CISA 120 identifies, for each action in the set of actions 214, a probability that a user will invoke the action when the content item is presented to the user. For example, as illustrated by Table 218, the CISA 120 can determine that there is a probability of pa that a user will invoke Action_11 if CI_1 is presented, and a probability of p12 that the user will invoke Action 12 if CI_1 is presented. Similarly, the CISA 120 can determine that if CI_2 is presented, there is a probability of p21 that the user will invoke Action_21 and a probability of p22 that the user will invoke Action_22. The CISA 120 can also determine that if CI_3 is presented, there is a probability of p31 that the user will invoke Action_31 and a probability of p32 that the user will invoke Action_32.

The probability that a user will invoke each particular action can be identified, for example, from the content item data 210 and/or content item data store 212. For example, each action each content item can be stored with information specifying the probability that the user will invoke each of the various actions that are provided by the content item.

In some implementations, the probability that a user will invoke a particular action of a particular content item can be determined based on historical data regarding user interactions with the particular content item. For example, the historical data, such as a log specifying contextual data for each previous impression (e.g., a resource with which the content item was presented, a time of day when the content item was presented, distribution criteria of the content item that were matched by the previous content item requests in response to which the content item was provided) and interaction data specifying which, if any, actions were invoked by a user when the content item was presented can be input to a predictive model that outputs a probability (or likelihood) that a user will invoke each of the actions provided by the content item. In some implementations, contextual data related to the received content item request 202 can also be input to the predictive model for purposes of obtaining probabilities that a user receiving the content item in response to the received content item request 202 will invoke the actions offered by the set of content items 204. The probabilities output by the model can be stored in the content item data store 212, and made available to the CISA 120.

Using at least the bids and the probabilities, the CISA 120 determines a set of auction scores 220 for the set of content items 204. For example, using the bid B1, and the probabilities P11 and P12, the CISA 120 can determine an auction score AS_1 222 for the content item CI_1. Similarly, the CISA 120 can use the bid B2, the probabilities P21 and P22 to determine an auction score AS_2 224 for the content item CI_2, and also use the bid B3, the probabilities P31 and P32 to determine an auction score AS_3 226 for the content item CI_3.

In some implementations, the CISA 120 can determine an auction score for each content item based on relationship (1).

$$AS_i = \sum_1^x pAction_x * bid_i \quad (1)$$

where, $AS_i$ is the auction score for content item i;

$pAction_x$ is the probability that a user will invoke Action_x that is provided by content item i if content item i is presented; and $bid_i$ is the bid specified for the content item i.

Generally, an auction score provided by relationship (1) provides an estimated value to a content sponsor of a presentation of a content item. For example, the individual value of each interaction is provided as a product of the probability (or likelihood) that the user will invoke the action and the bid of the content item.

Relationship (1) generally assumes that the content sponsor values each different action equally. However, as discussed above, each different action may provide a content sponsor a different amount of value. For example, assume that based on historical information, a content sponsor determines that a click to call action provides 20% (or some other amount) more value than a headline click. Further assume that the content sponsor determines that a map request action provides 10% (or some other amount) more value than a headline click. In this example, the amount that the content sponsor values, and/or is willing to pay for, a click to call action may be 20% more than the content sponsor is willing to pay for a headline click. Similarly, the content sponsor may be willing to pay 10% more for a map request than a headline click if the content sponsor values a map request 10% more than a headline click.

In some implementations, a content sponsor can use bid modifiers (or different bids) to specify different values that the content sponsor places on the different actions. A bid modifier is a value that is used to adjust the bid that the content sponsor specifies for distribution of a content item. The bid modifiers can be used to determine different amounts that the content sponsor is willing to pay for the various actions that are provided by the content items distributed for the content sponsor.

The content sponsor can specify a different bid modifier for each of the different actions that are provided by a content item. Continuing with the example above, the content sponsor can specify a bid modifier of 1.20 (or another value) for the click to call action and a bid modifier of 1.10 for the map request action. The bid modifier of 1.20 indicates that the content sponsor values the click to call action more than the headline click and is willing to pay 1.20 times the bid value when a user invokes the click to call action. Similarly, the bid modifier of 1.10 indicates that the content sponsor values the map request action more than the headline click action, and is willing to pay 1.10 times the bid value when a user invokes the map request action. Generally, the bid specified by the content sponsor is a value that the content sponsor is willing to pay for a headline click, but the bid could be associated with a different action, and the content sponsor could also specify a bid modifier for headline clicks if desired.

In some implementations, a content sponsor can specify different bids for each different action instead of (or in addition to) specifying a single bid and different bid modifiers for each action. In the example above, the content sponsor could specify a headline click bid of $1.00, a click to call bid of $1.20, and a map request bid of $1.10. This would enable the content sponsor to similarly differentiate the value that the content sponsor places on each of the different actions.

The bid modifiers (or different bids) specified by a content sponsor can be stored in the content item data store 212. For example, each bid modifier (or different bid) can be stored with a reference to the content item and action corresponding to the bid modifier (or different bid). Thus, when the CISA 120 obtains the content item data 210 from the content item data store, the bid modifiers (or bids) can be included in the content item data 210, and the CISA 120 can identify the bid modifiers from the content item data 210 that are received.

In some implementations, the CISA 120 can use the bid modifiers (or bids) when determining the set of auction scores 220. For example, the CISA 120 can use relationship (2) to determine auction scores for the content items.

$$AS_i = \sum_1^x pAction_x * bid_i * m_x \qquad (2)$$

where, $AS_i$ is the auction score for content item i;

$pAction_x$ is the probability that a user will invoke Action_x that is provided by content item i if content item i is presented;

$bid_i$ is the bid specified for the content item i; and $m_x$ is the bid modifier for Action_x of content item i.

The auction score obtained using relationship (2) considers the different values that the content sponsor has attached to the various actions that a user can invoke using the content item (e.g., using the bid modifier). Thus, relationship (2) provides an auction score that is based, in part, on the different benefit of each action to the content sponsor.

When a content sponsor specifies different bids for the different actions, mx of relationship (2) (and all other relationships discussed in this document) can be determined as a ratio of the bid for the particular action relative to a reference bid, such as the headline bid (e.g., $bid_x/bid_r$, where $bid_x$ is the bid for the action and $bid_r$ is the reference bid).

A user that invokes the click to call action (or another action) may have a positive experience during the call (e.g., satisfied with the customer service or outcome of the call), but it is possible that the user has a negative experience during the call (e.g., dissatisfied with customer service provided or outcome of the call). If the user has a negative experience, the user may attribute the negative experience to the CISA 120 that provided the content item.

In some implementations, the auction scores determined by the CISA 120 can take into account the possibility that the user will have a negative experience, and the impact that the negative experience may have on the user's attitude towards content items provided by the CISA 120. For example, the CISA 120 can use relationship (3) to determine the set of auction scores 220.

$$AS_i = \sum_1^x [pAction_x * bid_i * m_x] - \sum_1^x BadVisitCost_x * pBadVisit_x * pAction_x \qquad (3)$$

where, $AS_i$ is the auction score for content item i;

$pAction_x$ is the probability that a user will invoke Action_x that is provided by content item i if content item i is presented;

$bid_i$ is the bid specified for the content item i;

$m_x$ is the bid modifier for Action_x of content item i;

$BadVisitCost_x$ is a negative effect (e.g., expressed in a monetary value or some other value) of a bad user experience when Action_x of content item i is invoked;

$pBadVisit_x$ is the probability that a user will have a bad experience after invoking Action_x of content item i; and $\sum_1^x BadVisitCost_x * pBadVisit_x * pAction_x$ is an expression of an overall negative effect of providing the content item.

The $BadVisitCost_x$ can be specified by an administrator of the CISA 120. For example, if an administrator of the CISA 120 has determined the cost of a bad user experience for each of the actions, the CISA 120 can receive those values as input from the administrator of the CISA 120. In some implementations, the value assigned to $BadVisitCost_x$ can be estimated based on the relative impact that each type of action has on a user. For example, a bad user experience during a phone call may be generally more detrimental (e.g., expensive) than a bad user experience with a map that is provided in response to a map request, and a bad user experience with the map may be generally more detrimental (e.g., expensive) than a bad user experience with a headline click. Thus, the BadVisitCost for the click to call action may be set higher than the BadVisitCost for a map request action, which can be set higher than the BadVisitCost for a headline click. The BadVisitCost for each action can be stored, for example, in the content item data store 212 and/or received with the content item data 210.

In some implementations, the BadVisitCost can be specified on a per-query basis. For example, a particular BadVisitCost constant can be specified on a global basis (e.g., for all queries), for each particular category of queries (e.g., automobiles, art, or sports), or for each particular query. When the BadVisitCost is specified as a constant, it can either be stored in the content item data store 212, or be maintained in the CISA 120.

The probability specified by $pBadVisit_x$ can be determined based on user feedback (e.g., survey information) and/or inferred based on previous actions of users. For example, user survey information may reveal the portions of users that have bad experiences after invoking each of the different actions. In a particular example, the survey data may reveal that 5% of the users that invoke the click to call action have a bad experience (e.g., not connected, long hold time, dissatisfaction with outcome), while 3% of the users that invoke the map request action have a bad experience (e.g., map fails to load or directions are inaccurate), and 1% of the users that perform a headline click have a bad experience (e.g., failed page load or dissatisfaction with landing page content). In this example, the pBadVisit for the click to call, map request, and headline click can be respectively set to 0.05, 0.03, and 0.01. These values can be stored in the content item data store 212 and/or received by the CISA 120 with the content item data 210.

Using the set of auction scores 220, the CISA 120 ranks the set of content items 204. For example, assuming that AS_1>AS_2>AS_3, the CISA 120 can rank the set of content items 204 in the following order CI_1>CI_2>CI_3.

Using the rankings, the CISA 120 can select a set of winning content items 228 to be provided in response to the content item request 202. In some implementations, the set of winning content items 228 includes the N content items having the highest N auction scores, where N is a number of content items to be provided in response to the content item request 202. In the present example, the resource 114 includes two presentation positions 119a and 119b. Assuming that a content item will be presented in both content item slots 119a and 119b, the set of winning content items 228 in the present example will include CI_1, which has the highest auction score AS_1, and CI_2, which has the second highest auction score AS_2.

The CISA 120 outputs the set of winning content items 228 for presentation at the user device 106 in response to the content item request 202. In some implementations, the CISA 120 outputs the set of winning content items 228 by generating and sending code that cause the user device 106 to display the set of winning content items. For example, the CISA 120 can either transmit the set of wining content items (e.g., the files of the winning content items) to the user device 106, or transmit code that instructs the user device to fetch the set of winning content items 228 from one or more network locations.

The CISA 120 can also determine a price 230 that will be paid for distribution of each content item in the set of winning content items 228. The determination of a price to be paid for distribution of the set of winning content items 228 is discussed in detail with reference to FIG. 4.

Figure 3:
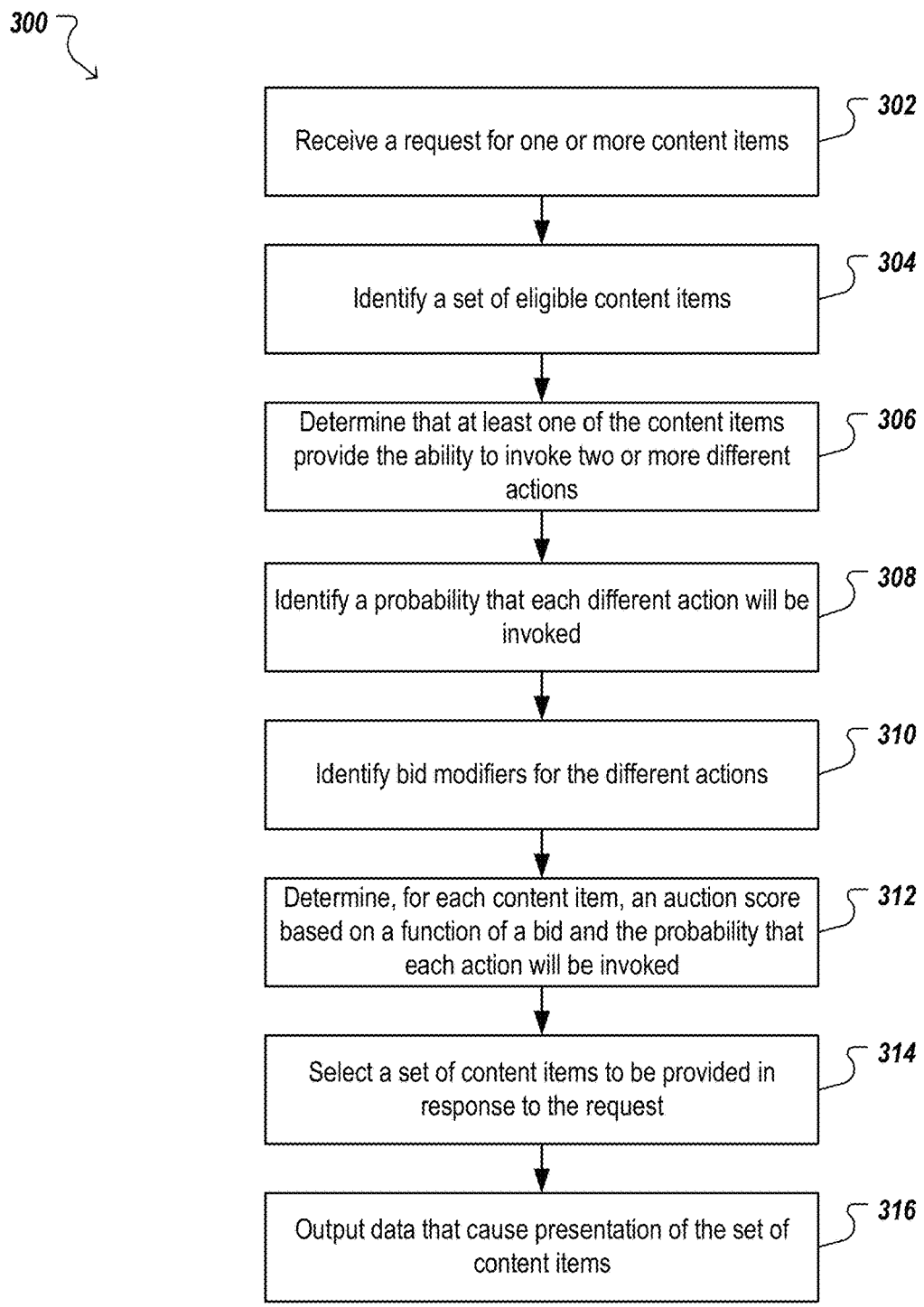
FIG. 3 is a flow chart of an example process for selecting a set of content items for distribution.

FIG. 3 is a flow chart of an example process 300 for selecting a set of content items for distribution. The process 300 can be performed, for example, by one or more data processing apparatus, such as the CISA 120 and/or the content distribution system 110 of FIG. 1. Operations of the process 300 can be implemented by instructions that when executed cause one or more data processing apparatus to perform operations of the process 300. The instructions can be stored on a non-transitory computer readable medium.

A request for one or more content items is received (302). In some implementations, the content item request is a request for one or more content items to be presented in at least some of two or more presentation positions of a resource. As discussed above with reference to FIG. 1, a content item can include multiple presentation positions. The content item request can include information specifying the number of presentation positions, which can correspond to a maximum number of content items that can be presented in a single page view and/or provided in response to the request.

A set of eligible content items are identified (304). In some implementations, the set of eligible content items are identified based on information included in the content item request. For example, as discussed above with reference to FIG. 1, each eligible content item can be identified based on the eligible content item having distribution parameters that are matched by information included in the content item request.

In some implementations, the content items in the identified set of eligible content items are associated with a bid. The bid for each content item specifies, for example, an amount that a content sponsor for the content item has specified for distribution of the content item. For example, a particular content sponsor may specify a CPC bid of $1.00 indicating that the content sponsor is willing to pay up to $1.00 for each headline click that the content item receives. In some implementations, CPC bids can be converted to eCPM bids as discussed above with reference to FIG. 1.

A determination is made that at least one of the eligible content items provide users the ability to invoke two or more different actions (306). In some implementations, the determination that a content item provides a user the ability to invoke two or more different actions includes a determination that the content item includes two or more different interactive elements that each cause different actions to be initiated in response to user interaction with the different interactive elements.

For example, a determination can be made that a particular content item includes a first interactive element that requests a particular landing page in response to user interaction with the first interactive element. Similarly, a determination can be made that the particular content item also includes a second interactive element that causes a user device to place a phone call to a specified phone number in response to user interaction with the second interactive element. Other interactive elements that users can interact with to invoke other actions can also be determined to be included in the particular content item.

In some implementations, the determination that the particular content item includes multiple different interaction elements and/or provides the ability for a user to invoke multiple different actions can be made based on information provided by a content sponsor of the particular content item. For example, the content sponsor may specify the different actions that can be invoked through user interaction with the particular content item. The data specifying the different actions can be stored, for example, in a data store and accessed when the particular content item is identified as an eligible content item for a content item request.

A probability that each different action will be invoked is identified (308). In some implementations, the probability that each different action will be invoked is based, for example, on a probability that a user will interact with the interaction element of the content item that causes the action to be performed. For example, if the content item includes a click to call interaction element, the probability that the click to call action will be invoked by a user can be based on the likelihood that the user will interact with the click to call interaction element. The probability that each different action will be invoked can be accessed, for example, from a data store that includes stored associations between content items, actions, and probabilities that each of the actions provided by each of the content items will be invoked when the content item is presented. The probability that each action will be invoked can be determined, for example, based on historical data as discussed above with reference to FIG. 2.

One or more bid modifiers are identified for the different actions (310). As discussed above with reference to FIG. 2, each bid modifier is a value (e.g., a multiplier or divisor) that is used to adjust the bid that the content sponsor specifies for a content item. In some implementations, a content sponsor can specify a different bid modifier for zero, one, or more of the different actions that are provided by the content items. For example, as discussed above with reference to FIG. 2, a content sponsor can specify higher bid modifiers for actions that provide greater benefit (e.g., monetary value or branding value) than the bid modifiers (if any) that are assigned to other actions that provide less benefit. The bid modifiers can be identified (or accessed) from a data store (e.g., data store 212 of FIG. 2) that stores associations between content items, actions provided by the content items, and bid modifiers for the actions.

An auction score is determined for each of the eligible content items (312). In some implementations, the auction score is determined based on a function of the bid, the bid modifier for each different action, and the probability that each interaction will be invoked by a user if the content item is provided in response to the content item request. The auction score can be determined, for example, based on a difference between a sum of benefits (e.g., positive values to the user and/or CISA 120) and a sum of costs (e.g., negative values to the user and/or CISA 120) associated with presentation of the content item.

For example, as discussed above with reference to FIG. 2 and relationships (1)-(3), the auction score for each content item can be a score specifying a value associated with presentation of the content item, which takes into account the probability that a user will invoke each action, the bid modifiers representing the perceived or estimated value of each action relative to the perceived or estimated values of the other actions, a probability that the user has a bad experience after invoking each action, and the cost to the CISA 120 of the user having a bad experience after invoking each of the actions. As discussed above, the auction score can be determined using any of the relationships (1)-(3).

A set of content items to be provided in response to the request is selected (314). In some implementations, the set of content items can be selected based on the auction scores for the eligible content items. For example, as discussed above with reference to FIG. 2, the set of content items can include the N content items that have the highest N auction scores, where N is the number of content items that will be provided in response to the content item request.

Data that cause presentation of the set of content items are generated and provided (316). In some implementations, the data include data representing each of the selected content items. In some implementations, the data include code that causes the user device to retrieve data representing the content items are provided to the user device. For example, the code can include instructions that cause the user device to retrieve the content items from a specified network location (e.g., from a specified content item repository).

Figure 4:
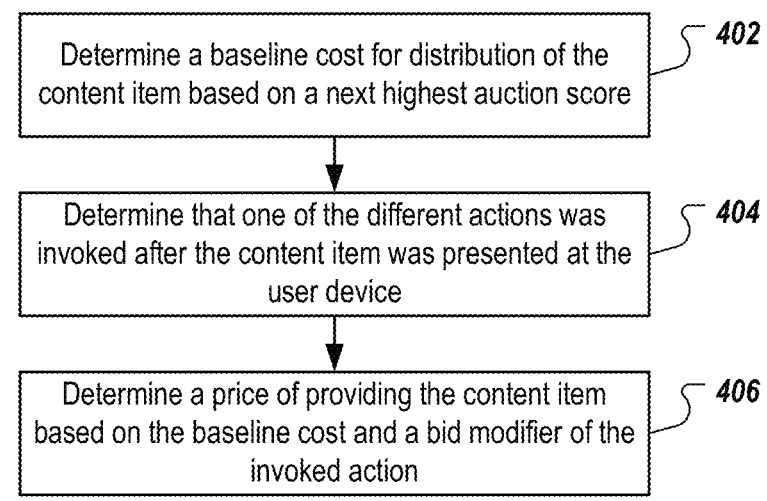
FIG. 4 is a flow chart of an example process for determining a price of distributing a content item.

FIG. 4 is a flow chart of an example process for determining a price of distributing a content item. The process 400 can be performed, for example, by one or more data processing apparatus, such as the CISA 120 and/or the content distribution system 110 of FIG. 1. Operations of the process 400 can be implemented by instructions that when executed cause one or more data processing apparatus to perform operations of the process 400. The instructions can be stored on a non-transitory computer readable medium.

A baseline cost for distribution of the content item is determined (402). In some implementations, the baseline cost is an amount that a content sponsor will pay for distribution of a content item when an action that does not have a bid modifier, or has a bid modifier (e.g., multiplier) of 1.0 is invoked. For example, assume that a content sponsor does not specify a bid modifier for a headline click (or specifies a bid modifier of 1.0). Further assume that the content item receives a headline click when presented in response to a content item request. In this example, the amount paid by the content sponsor for distribution of the content item can be the baseline cost.

In some implementations, the baseline cost is determined based, at least in part, on a next highest auction score. For example, with reference to FIG. 2, the baseline cost of distributing CI_1, which is associated with the highest auction score AS_1, can be determined based, in part, on the auction score AS_2, which is the second highest auction score in that example. Similarly, the baseline cost of distributing CI_2, which is associated with the second highest auction score AS_2, can be determined based, in part, on the third highest auction score AS_3. As discussed in more detail below, the baseline cost can also be determined based on the bid modifiers for the actions provided by the content item, and the probability the each of the actions will be invoked if the content item is provided in response to the content item request.

The baseline cost can be, for example, the minimum amount that a content sponsor must pay in order to maintain their ranking in the content item selection process. For example, the baseline cost for CI_1 in the example above can be the minimum amount that the content sponsor of CI_1 must pay (or bid) to maintain the highest auction score. In some implementations, the minimum amount that a content sponsor must pay in order to maintain their ranking can be determined by determining the bid that will keep the auction score for the content item at least equal to that of the next highest auction score. The minimum amount can be determined, for example, based on a ratio of a sum of the next highest auction score and an overall negative effect (e.g., to the CISA 120) of providing the content item relative to a weighted sum of the probabilities that each of the actions will be invoked, as represented by relationship (4).

$$BaselineCost_i = \frac{NextHighestAS + OverallNegativeEffect_i}{\sum_{1}^{x} m_x * pAction_x} \quad (4)$$

where,

BaselineCost$_i$ is the baseline cost for content item i;

NextHighestAS is the next highest auction score relative to the auction score for content item i;

OverallNegativeEffect$_i$ is the overall negative effect associated with presentation of content item i;

pAction$_x$ is the probability that a user will invoke Action_x of the content item i; and m$_x$ is the bid modifier for Action_x of content item i.

In some implementations, the OverallNegativeEffecti can be determined using relationship (5).

$$\sum_{1}^{x} BadVisitCost_x * pBadVisit_x * pAction_x \quad (5)$$

where,

BadVisitCost$_x$ is a negative effect (e.g., expressed in a monetary value) of a bad user experience when Action_x of content item i is invoked;

pBadVisit$_x$ is the probability that a user will have a bad experience after invoking Action_x of content item i; and pAction$_x$ is the probability that a user will invoke Action_x that is provided by content item i if content item i is presented.

According to relationships (4) and (5), the baseline cost can be determined, in part, by determining, for each of the actions, a weighted probability (e.g., a product of the probability that a user will invoke the action and a bid modifier for the action). The weighted probabilities determined for each of the actions are summed to obtain a weighted sum of the probabilities. The next highest auction score is summed with the overall negative effect of providing the content item to obtain a modified next highest auction score. In turn, the baseline cost is determined based on the ratio of the modified next highest auction score relative to the weighted sum of the probabilities.

A determination is made that one of the different actions was invoked after presentation of the content items at the user device (404). In some implementations, the determination that one of the different actions was invoked is made based on receipt of data from the user device indicating that the user interacted with an interface element that causes the action to be performed. For example, user interaction with a click to call interface element can cause the user device to submit interaction data to the CISA 120 or the content distribution apparatus 110 (or another processing apparatus) indicating that the user interacted with the click to call interface element.

A price of providing the content item is determined in response to determining that one of the different actions was invoked (406). In some implementations, the price of providing (or distributing) the content item can be based on the baseline cost and the bid modifier of the invoked action. For example, the price of providing the content item can be a product of the baseline cost and the bid modifier of the invoked action. For purposes of illustration, assume that a user invoked Action_11 after presentation of CI_1. Also assume that the baseline cost for CI_1 is BC_1 and that the content sponsor of CI_1 specified a bid modifier of m_11 for the Action_11 of content item CI_1. In this example, price of providing content item CI_1 can be the result of BC_1*m_11. The content sponsor of CI_1 can be charged this price for distribution of the content item CI_1.

Figure 5:
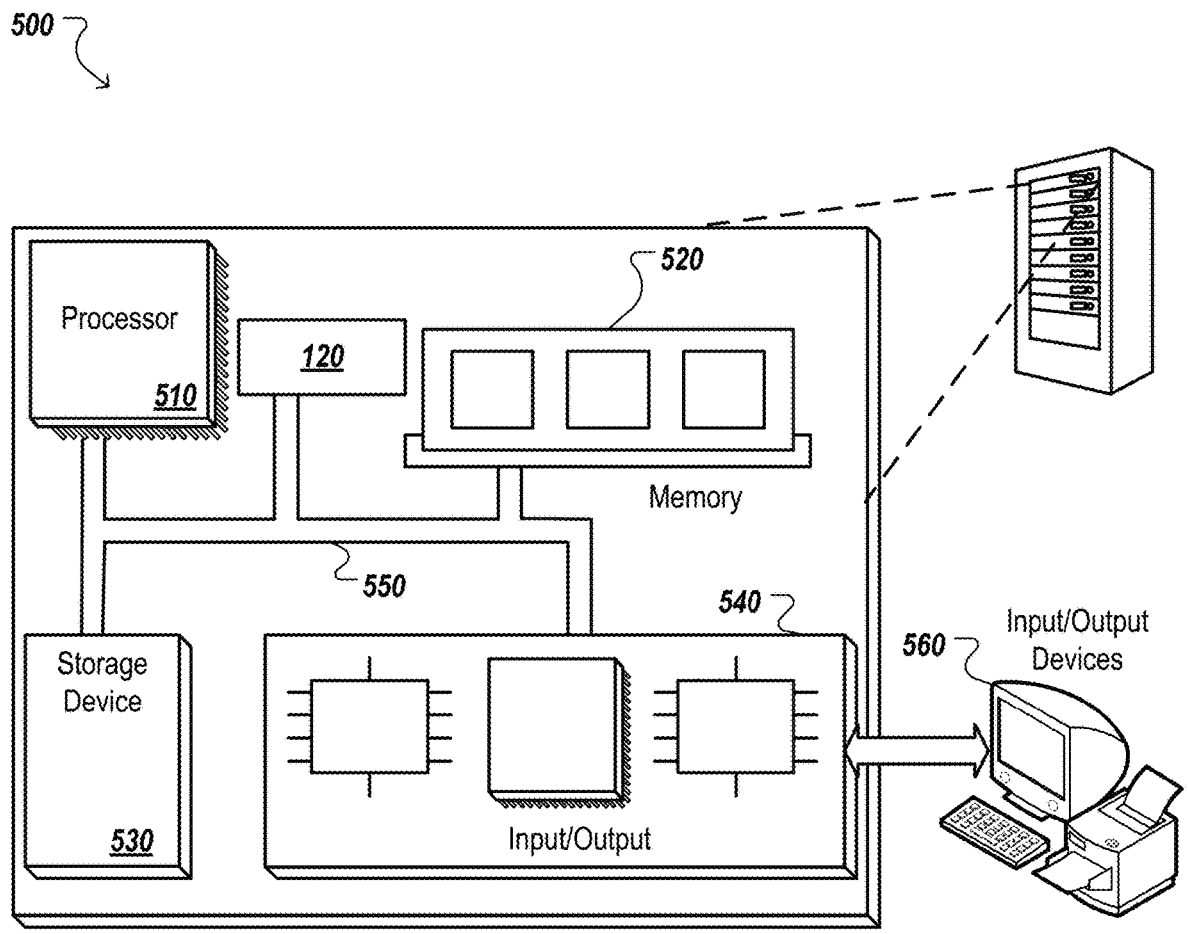
FIG. 5 is a block diagram of an example computer system.

FIG. 5 is a block diagram of an example computer system 500 that can be used to perform operations described above. The system 500 includes a processor 510, a memory 520, a storage device 530, and an input/output device 540. Each of the components 510, 520, 530, and 540 can be interconnected, for example, to the CISA 120 using a system bus 550. The processor 510 is capable of processing instructions for execution within the system 500. In one implementation, the processor 510 is a single-threaded processor. In another implementation, the processor 510 is a multi-threaded processor. The processor 510 is capable of processing instructions stored in the memory 520 or on the storage device 530.

The memory 520 stores information within the system 500. In one implementation, the memory 520 is a computer-readable medium. In one implementation, the memory 520 is a volatile memory unit. In another implementation, the memory 520 is a non-volatile memory unit.

The storage device 530 is capable of providing mass storage for the system 500. In one implementation, the storage device 530 is a computer-readable medium. In various different implementations, the storage device 530 can include, for example, a hard disk device, an optical disk device, a storage device that is shared over a network by multiple computing devices (e.g., a cloud storage device), or some other large capacity storage device.

The input/output device 540 provides input/output operations for the system 500. In one implementation, the input/output device 540 can include one or more of a network interface devices, e.g., an Ethernet card, a serial communication device, e.g., and RS-232 port, and/or a wireless interface device, e.g., and 802.11 card. In another implementation, the input/output device can include driver devices configured to receive input data and send output data to other input/output devices, e.g., keyboard, printer and display devices 560. Other implementations, however, can also be used, such as mobile computing devices, mobile communication devices, set-top box television client devices, etc.

Although an example processing system has been described in FIG. 5, implementations of the subject matter and the functional operations described in this specification can be implemented in other types of digital electronic circuitry, or in computer software, firmware, or hardware, including the structures disclosed in this specification and their structural equivalents, or in combinations of one or more of them.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method performed by data processing apparatus, the method comprising:

identifying a content item that is eligible to be provided and an amount that has been specified for distribution of the content item;

determining, by one or more data processing apparatus, that the identified content item includes two or more different interactive elements that each cause different types of actions to be initiated in response to user interaction with the different interactive elements, wherein one or more of the different types of actions includes actions beyond the user being redirected to a landing page in response to clicking on the identified content item;

identifying, for at least one different type of action, a relative probability that the at least one different type of action will be invoked through user interaction with an interactive element of the content item and a modifier for the amount;

determining, by one or more data processing apparatus, a score for the content item based on a function of the amount, the modifier, and the relative probability that the at least one different type of interaction will be invoked; and outputting, by one or more data processing apparatus, the selected content item to a user device based on the score.

2. The method of claim 1, further comprising determining a baseline score for the content item based on a next highest score relative to the score for the content item, the relative probability that each different type of action will be invoked, and the modifier for each different type of action.

3. The method of claim 2, further comprising:
determining that one of the different types of actions was invoked after the content item was provided for presentation at the user device; and
determining a minimum score for outputting the selected content item based on the baseline score and the modifier for the invoked action.

4. The method of claim 3, wherein determining the minimum score comprises determining a product of the baseline score and the modifier for the invoked action.

5. The method of claim 2, wherein determining a baseline score comprises determining a ratio of a sum of the next highest score and an overall negative effect of providing the content item relative to a weighted sum of the relative probabilities that each of the different types of actions will be invoked.

6. The method of claim 5, wherein determining the ratio comprises:
determining a first product of a first relative probability that a user will invoke a first action and the modifier for the first type of action;
determining a second product of a second relative probability that a user will invoke a second action and the modifier for the second type of action;
summing the first product and the second product to obtain the weighted sum of the relative probabilities;
summing the next highest score and the overall negative effect of providing the content item to obtain a modified next highest score; and
determining the baseline score based on a ratio of the modified next highest score and the weighted sum of the relative probabilities.

7. The method of claim 1, wherein determining a score for the content item comprises determining a difference between an estimated benefit corresponding to distribution of the content item and an overall negative effect of providing the content item;
wherein a content item request is received from a user device;
wherein one or more of the different types of actions includes user interaction with a click to call interface element or other actions executed through the graphical user interface of the user device beyond the user clicking on the identified content item, wherein one or more of the different types of actions include initiating a phone call in response to the user interaction with the click to call interface element or other actions beyond displaying a landing page linked to by the content item in response to the user clicking on the second content item; and
wherein outputting the selected content item to a user device based on the score comprises outputting the selected content item in response to receiving the content item request from the user device.

8. A non-transitory computer storage medium encoded with a computer program, the program comprising instructions that when executed by one or more data processing apparatus cause the one or more data processing apparatus to perform operations comprising:
identifying a content item that is eligible to be provided and an amount that has been specified for distribution of the content item;
determining, by one or more data processing apparatus, that the identified content item includes two or more different interactive elements that each cause different types of actions to be initiated in response to user interaction with the different interactive elements, wherein one or more of the different types of actions includes actions beyond the user being redirected to a landing page in response to clicking on the identified content item;
identifying, for at least one different type of action, a relative probability that the at least one different type of action will be invoked through user interaction with an interactive element of the content item and a modifier for the amount;
determining, by one or more data processing apparatus, a score for the content item based on a function of the amount, the modifier, and the relative probability that the at least one different type of interaction will be invoked; and
outputting, by one or more data processing apparatus, the selected content item to a user device based on the score.

9. The non-transitory computer storage medium of claim 8, the operations further comprising determining a baseline score for the content item based on a next highest score relative to the score for the content item, the relative probability that each different type of action will be invoked, and the modifier for each different type of action.

10. The non-transitory computer storage medium of claim 9, the operations further comprising:
determining that one of the different types of actions was invoked after the content item was provided for presentation at the user device; and
determining a minimum score for outputting the selected content item based on the baseline score and the modifier for the invoked action.

11. The non-transitory computer storage medium of claim 10, wherein determining the minimum score comprises determining a product of the baseline score and the modifier for the invoked action.

12. The non-transitory computer storage medium of claim 9, wherein determining a baseline score comprises determining a ratio of a sum of the next highest score and an overall negative effect of providing the content item relative to a weighted sum of the relative probabilities that each of the different types of actions will be invoked.

13. The non-transitory computer storage medium of claim 12, wherein determining the ratio comprises:
determining a first product of a first relative probability that a user will invoke a first action and the modifier for the first type of action;

determining a second product of a second relative probability that a user will invoke a second action and the modifier for the second type of action;

summing the first product and the second product to obtain the weighted sum of the relative probabilities;

summing the next highest score and the overall negative effect of providing the content item to obtain a modified next highest score; and determining the baseline score based on a ratio of the modified next highest score and the weighted sum of the relative probabilities.

14. The method of claim 8, wherein determining a score for the content item comprises determining a difference between an estimated benefit corresponding to distribution of the content item and an overall negative effect of providing the content item;

wherein a content item request is received from a user device;

wherein one or more of the different types of actions includes user interaction with a click to call interface element or other actions executed through the graphical user interface of the user device beyond the user clicking on the identified content item, wherein one or more of the different types of actions include initiating a phone call in response to the user interaction with the click to call interface element or other actions beyond displaying a landing page linked to by the content item in response to the user clicking on the second content item; and wherein outputting the selected content item to a user device based on the score comprises outputting the selected content item in response to receiving the content item request from the user device.

15. A system comprising:

a data store storing, for each of a plurality of content items, an amount that a content sponsor has specified for distribution of the content item;

one or more data processing apparatus that interact with the data store and execute instructions that cause the one or more data processing apparatus to perform operations comprising:

identifying a content item that is eligible to be provided and an amount that has been specified for distribution of the content item;

determining, by one or more data processing apparatus, that the identified content item includes two or more different interactive elements that each cause different types of actions to be initiated in response to user interaction with the different interactive elements, wherein one or more of the different types of actions includes actions beyond the user being redirected to a landing page in response to clicking on the identified content item;

identifying, for at least one different type of action, a relative probability that the at least one different type of action will be invoked through user interaction with an interactive element of the content item and a modifier for the amount;

determining, by one or more data processing apparatus, a score for the content item based on a function of the amount, the modifier, and the relative probability that the at least one different type of interaction will be invoked; and outputting, by one or more data processing apparatus, the selected content item to a user device based on the score.

16. The system of claim 15, the operations further comprising determining a baseline score for the content item based on a next highest score relative to the score for the content item, the relative probability that each different type of action will be invoked, and the modifier for each different type of action.

17. The system of claim 16, the operations further comprising:

determining that one of the different types of actions was invoked after the content item was provided for presentation at the user device; and determining a minimum score for outputting the selected content item based on the baseline score and the modifier for the invoked action.

18. The system of claim 17, wherein determining the minimum score comprises determining a product of the baseline score and the modifier for the invoked action.

19. The system of claim 16, wherein determining a baseline score comprises determining a ratio of a sum of the next highest score and an overall negative effect of providing the content item relative to a weighted sum of the relative probabilities that each of the different types of actions will be invoked.

20. The system of claim 15, wherein determining a score for the content item comprises determining a difference between an estimated benefit corresponding to distribution of the content item and an overall negative effect of providing the content item;

wherein a content item request is received from a user device;

wherein one or more of the different types of actions includes user interaction with a click to call interface element or other actions executed through the graphical user interface of the user device beyond the user clicking on the identified content item, wherein one or more of the different types of actions include initiating a phone call in response to the user interaction with the click to call interface element or other actions beyond displaying a landing page linked to by the content item in response to the user clicking on the second content item; and wherein outputting the selected content item to a user device based on the score comprises outputting the selected content item in response to receiving the content item request from the user device.

\* \* \* \* \*